United States Patent [19]

Fukushima et al.

[11] Patent Number: 4,878,065

[45] Date of Patent: Oct. 31, 1989

[54] THERMAL PRINTING CONTROL CIRCUIT

[75] Inventors: Itaru Fukushima, Tokyo; Takashi Okamoto; Hisashi Deguchi, both of Kyoto, all of Japan

[73] Assignees: NEC Corporation, Tokyo; Susumu Corporation, Ltd., Kyoto, both of Japan

[21] Appl. No.: 236,808

[22] Filed: Aug. 26, 1988

[30] Foreign Application Priority Data

Aug. 28, 1987 [JP] Japan ................................ 62-214810

[51] Int. Cl.⁴ ................................................ G01D 15/10

[52] U.S. Cl. ................................................ 346/76 PH

[58] Field of Search ..................................... 346/76 PH

[56] References Cited

U.S. PATENT DOCUMENTS 4,567,488 1/1986 Moriguchi et al. ............ 346/76 PH

FOREIGN PATENT DOCUMENTS 0176070 10/1984 Japan .............................. 346/76 PH

OTHER PUBLICATIONS

IBM Technical Disclosure Bulletin vol. 24, No. 13, Jun. 1981, "Thermal Printed Drive Circuit For High Speed Printing".

*Primary Examiner*—H. Broome
*Assistant Examiner*—Huan Tran
*Attorney, Agent, or Firm*—Sughrue, Mion, Zinn, Macpeak & Seas

[57] ABSTRACT

A thermal printing control circuit includes a first shift register for receiving and storing a series of serial printing image data to be printed by a plurality of thermal print elements, a second register, constituted by a plurality of registers for storing contents of the first shift register by parallelly and sequentially shifting and receiving the contents thereof, for storing printing history data of a plurality of cycles of the thermal print elements, and a logic circuit for performing a logic operation by using the printing history data of the plurality of cycles of the plurality of thermal print elements, the printing history data being stored in the second shift register, and externally supplied control timing signals and for generating drive signals representing voltage waveforms to be applied to the plurality of thermal print elements.

3 Claims, 7 Drawing Sheets

THERMAL PRINTING CONTROL CIRCUIT

BACKGROUND OF THE INVENTION

The present invention relates to a thermal printing control circuit and, more particularly, to a heat control circuit of a thermal printing head.

A thermal printing head comprises a plurality of print elements constituted by resistors arrayed in a line in correspondence with dots to be printed. Each print element is heated by applying a voltage pulse thereto for a short period of time at the timing for printing a corresponding dot. The dot is printed on print paper by keeping the print element at a temperature higher than the heat-sensitive temperature of the print paper for a certain period of time. Then, the heat of the print element is naturally dissipated upon removal of the voltage pulses and the temperature of the print element is dropped below the heat-sensitive temperature. The above operation is repeated each time a dot is printed.

Recently, as the printing speed of a printer is considerably increased, several problems have been posed in heat control of the above-described printing head.

"Thermal Printhead Drive Circuit for High Speed Pinting", IBM Technical Disclosure Bulletin, vol. 24, No. 1B, June 1981, pp. 646–648 describes a countermeasure for solving the problem of insufficient temperature rise caused by a decrease in duty cycle of an applied pulse due to high printing speed.

In contrast to the above problem, in a recent high-speed thermal printer, when, for example, linear printing is performed, since heating of print elements is successively repeated, heat of the print head is accumulated and the printing thickness of the dot is increased. This gradually causes unclear printing, thus posing another problem.

No proper countermeasure for solving this problem has yet been proposed by any prior art.

SUMMARY OF THE INVENTION

It is an object of the present invention to eliminate the drawbacks of the above-described prior art and provide a thermal printing control circuit for preventing changes in printing thickness due to the accumulated heat of a print head even in a continuous, high-speed printing operation.

A thermal printing control circuit according to the present invention comprises: a first shift register for receiving and storing a series of serial printing image data to be printed by a plurality of thermal print elements; a second register, constituted by a plurality of registers for storing contents of the first shift register by parallelly and sequentially shifting and receiving the contents thereof, for storing printing history data of a plurality of cycles of the thermal print elements; and a logic circuit for performing a logic operation by using the printing history data of the plurality of cycles of the plurality of thermal print elements, the printing history data being stored in the second shift register, and externally supplied control timing signals and for generating drive signals representing voltage waveforms to be applied in a current cycle to the plurality of thermal print elements.

DETAILED DESCRIPTION OF THE PREFERRED EMBODIMENT

Prior to description of an embodiment of the present invention, logical and experimental analysis made by the present inventor will be described below.

Figure 1A:
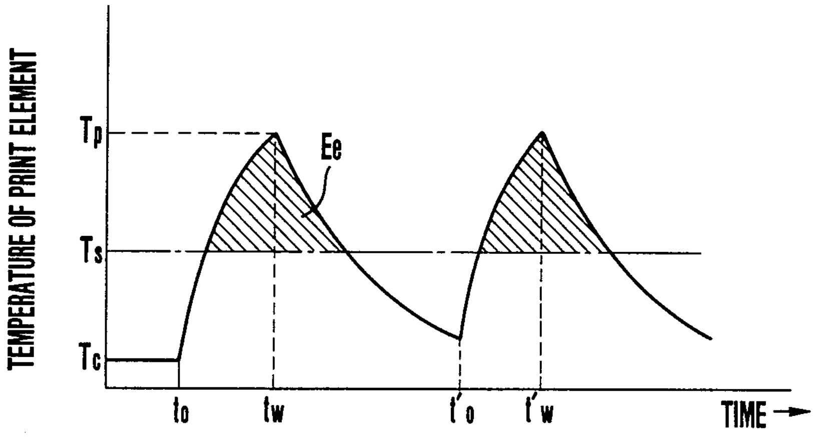
FIGS. 1A, 1B, 2, 3, 4, and 5 are timing charts for explaining analysis in the present invention.
Figure 1B:
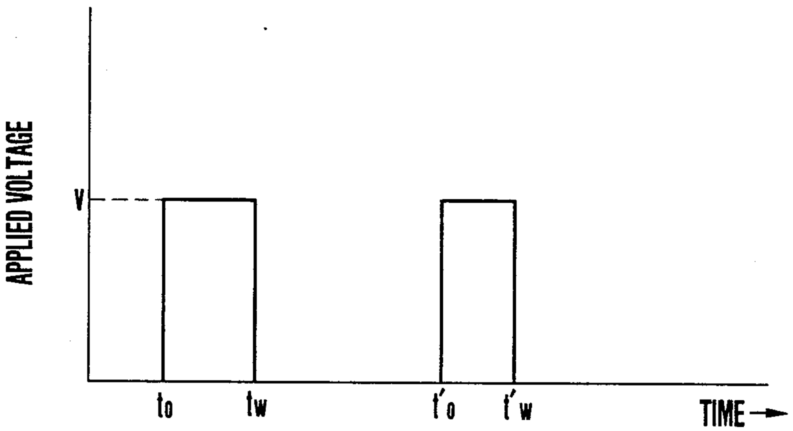

FIGS. 1A and 1B show a relationship between driving of one print element and generation of heat. FIGS. 1A and 1B respectively show changes in temperature of the print element and the applied voltage as a function of time.

Referring to FIGS. 1A and 1B, when a voltage pulse with a voltage V is applied to a print element for a time interval between time $t_0$ and time $t_w$, the temperature of the element is raised from $T_c$ to $T_p$. From the results of experiments, the operation during this time interval is considered as a primary delay response with respect to a step input signal having a time constant determined by the specific heat (heat capacity) of a printing head. When the voltage pulse is removed at time $t_w$, a heat dissipation/cooling period starts. This heat dissipation operation is also a primary delay response. The heat dissipation/cooling period continues untill next pulse application time $t_0'$.

Assuming that the heat-sensitive temperature of an ink film or heat-sensitive paper used in combination with the thermal printing head is $T_s$ in FIG. 1A, then a heat energy component having a temperature higher than $T_s$ is proportional to an area Ee of a hatched portion in FIG. 1A. Accordingly, the heat energy which is generated by the print element and contributes to dot printing can be kept constant by controlling the area Ee to be always constant thereby to keep constant the printing thickness of dot on the ink film or film heat-sensitive paper. In order to realize this, when the period of voltage application is short, i.e., high-speed printing is performed, the period of voltage application must be variable, and, therefore, voltage application and removal times $t_0$, $t_w$, $t_0'$, and $t_w'$ must be controlled so as to keep the area of the hatched portions in first and second cycles constant as shown in FIGS. 1A and 1B.

The detailed analysis about the conditions for determing the above times will be described below.

Figure 2:
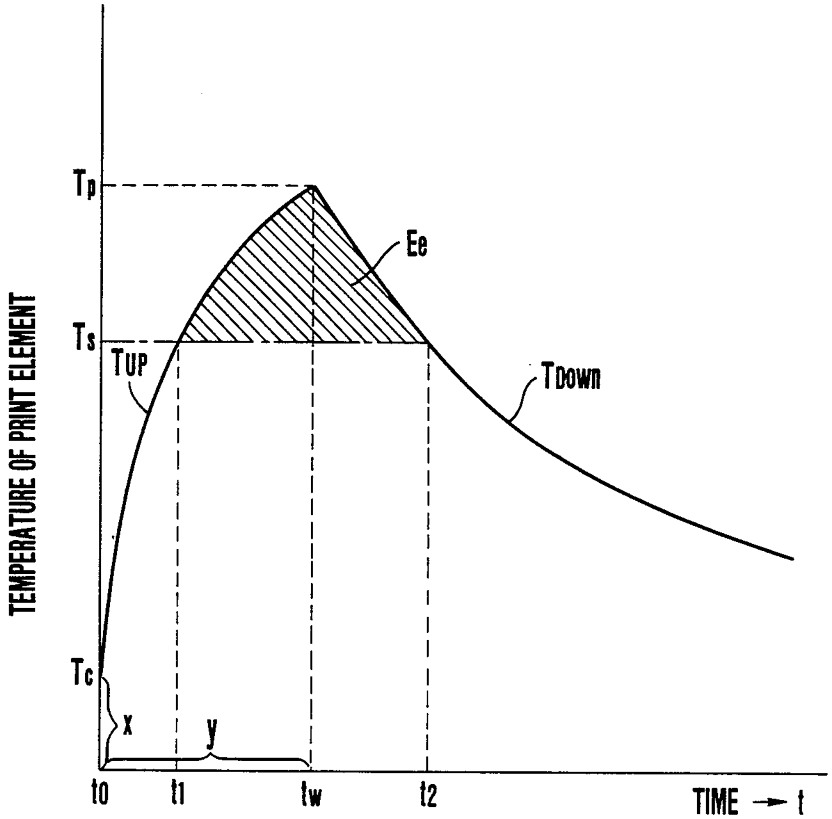

FIG. 2 shows primary delay response curves $T_{UP}$ and $T_{DOWN}$ in voltage application and heat dissipation periods of a print element. Referring to FIG. 2, assume that the temperature of a printing head is $T_c$ at time $t_0$ when voltage application to a print element is started. The temperature of the printing head is dropped to $T_c$ while the heat is dissipated after the immediately preceding voltage application is finished. This temperature $T_c$ is called an accumulated heat temperature.

Assume that:

x: a temperature of the print element at voltage application time $t_0$, i.e., $T_c$;

y: a voltage application time interval $(t_w - t_0)$ where $t_w$ is voltage application end time;

Ee: effective heat energy (proportional to the area Ee of a portion having a temperature higher than the heat-sensitive temperature $T_s$) for heat-sensitive paper or an ink film;

$\tau$: heat generation and heat dissipation time constants (identical to each other);

$T_S$: a heat-sensitive temperature;

$T_p$: a peak temperature;

$T_M$: a saturation temperature, i.e., a convergent temperature when voltage application is continued for a long period of time;

$t_1$: time when the curve $T_{UP}$ crosses the heat-sensitive temperature $T_S$; and $t_2$: time when the curve $T_{DOWN}$ crosses the heat-sensitive temperature $T_s$.

If the origin of time t is $t_0$, i.e., $t_0=0$, the curve $T_{UP}$ in a voltage application period can be represented as a primary delay response curve in response to a step input as follows:

$$T_{UP} = T_M - (T_M - x)e^{-\frac{t}{\tau}} \quad (1)$$

Similarly, the response curve $T_{DOWN}$ in a heat dissipation period can be represented by:

$$T_{DOWN} = T_P \cdot e^{-\frac{t-y}{\tau}} \quad (2)$$

Therefore, the area Ee defined by the curves $T_{UP}$ and $T_{DOWN}$, and an alternately long and short dashed line representing the heat-sensitive temperature $T_s$ can be given by:

$$Ee = T_M(y - t_1) - T_S(t_2 - t_1) \quad (3)$$

Accordingly, the conditions for keeping the area Ee constant regardless of the accumulated temperature $T_c$, i.e., x, in other words, the heat control conditions according to the principal idea of the present invention are those satisfying $dEe/dx=0$.

According to equation (3), $$\frac{dEe}{dx} = T_M\frac{dy}{dx} - (T_M - T_S)\frac{dt_1}{dx} - T_S\frac{dt_2}{dx} = 0 \quad (4)$$

That is, $$T_M \cdot (T_p - T_S) \cdot \left(\frac{dy}{dx} + \frac{\tau}{T_M - x}\right) = 0 \quad (5)$$

Since $T_M \neq 0$ and $T_P - T_S \neq 0$ are established, the following equation is given:

$$\frac{dy}{dx} + \frac{\tau}{T_M - x} = 0$$

Therefore, $$y = \tau \cdot \log (T_M - x) + C \quad (6)$$

If x=0, i.e., a printing time interval without accumulated heat is y=n, the constant C is determined, and hence:

$$y = \tau \cdot \log\left(\frac{T_M - x}{T_M}\right) + n \quad (7)$$

Since $T_{UP}=T_p$ when $t=t_w$, according to equation (1), $$T_p = T_M - (T_M - x)\, e^{\frac{-y}{\tau}} \quad (8)$$

From equations (7) and (8), $$T_p = T_M(1 - e^{\frac{-n}{\tau}}) \quad (9)$$

Therefore, a substitution of equation (9) into equation (2) yields:

$$T_{DOWN} = T_M(1 - e^{\frac{-n}{\tau}}) \cdot e^{-\frac{t-y}{\tau}} \quad (10)$$

Accordingly, if an optimal printing time period at a time point after a lapse of time t from the start of the preceding voltage application is y' and a printing time period in the initial cycle is y, then, the following equation is obtained:

$$y' = \tau \cdot \log\{1 - (1 - e^{-\frac{n}{\tau}}) \cdot e^{-\frac{t-y}{\tau}}\} + n \quad (11)$$

That is, the optimal time period for the voltage application y' in the current cycle in determined by an elapsed time (t−y) from the voltage application end timing $t_w$ in the preceding cycle according to equation (11).

However, it is not practical to perform printing control while calculation of equation (11) is performed because it requires a long processing time. Therefore, equation (12) is obtained by approximating the elapsed time (t−y) with (t−n):

$$y' = \tau\log\{1 - (e^{\frac{n}{\tau}} - 1) \cdot e^{-\frac{t}{\tau}}\} + n \quad (12)$$

In addition, since the duty cycle for each dot is usually constant in a printing period, if its printing cycle time is $t_c$ and the number of cycles without voltage application (i.e., cycles in which the paper is kept blank) from the preceding printing period is $C_Y$, a time interval when printing is not performed can be represented by:

$$C_Y \cdot t_c$$

Therefore, an optimal voltage application time interval immediately after printing is not performed for the number $C_Y$ of cycles can be given by substituting $t=C_Y \cdot t_c$ into equation (12):

$$y' = \tau\log\{1 - (e^{\frac{n}{\tau}} - 1) \cdot e^{-\frac{C_Y \cdot t_c}{\tau}}\} + n \quad (13)$$

In this case, since $\tau$, n, and $T_c$ are normally constants, a relationship between $C_Y$ and y' can be calculated by using equation (13).

Therefore, the voltage application time interval y' is calculated in advance by using the values $\tau$, n, and $T_c$ experimentarily obtained with respect to the number $C_Y$ of cycles from one to, e.g., four or six values, and calculation results are stored in a control circuit as a table of correspondence between $C_Y$ and y', so that printing time intervals are controlled by utilizing the stored values in a printing operation, thereby performing a stable printing operation without an accumulated heat of the printing head.

Figure 3:
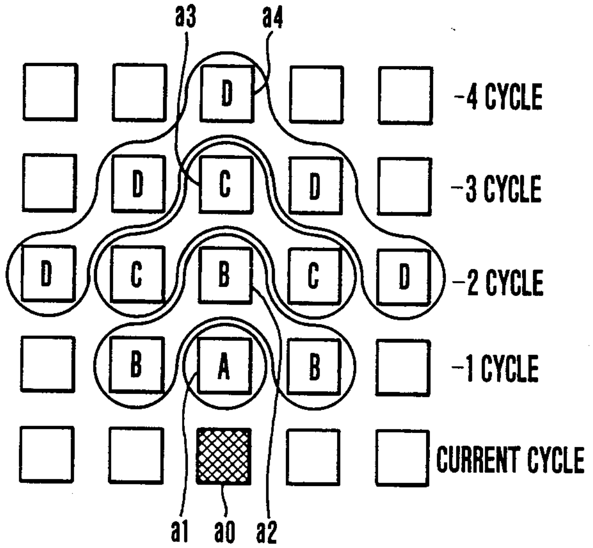

In the above-described analysis, attention has been paid on only one print element of the printing head, and only the voltage application history of the print element head has been considered. In practice, for example, even if a voltge is not applied to a given print element for a long period of time, when a voltage is continuously applied to its adjacent print element, the given print element is influenced by the heat generation of the adjacent print element. FIG. 3 is a view for explaining the principle of control when the voltage application history data of two pairs of print elements on both sides of a print element to which a voltage is to be applied are considered.

Referring to FIG. 3, each of 5×5 rectangles is a dot to be printed by a corresponding print element. Each column corresponds to five print elements, and rows respectively correspond to a current cycle, a cycle which is one ahead of the current cycle, a cycle which is two ahead thereof, a cycle which is three ahead thereof, and a cycle which is four ahead thereof, in the order from the lowermost row.

A cross-hatched dot $a_0$ is taken into consideration.

In the above-described analysis, the voltage application time of the dot $a_0$ is determined by using only the voltage application history data of dots $a_1$ to $a_4$ which are in the same column as the dot $a_0$ and are one to four ahead of the current cycle. In the present invention, however, a two-dimension control function is introduced so that a further reliable printing operation can be realized. More specifically, the aforementioned consideration of the influence of the voltage application history of a print element in the one to four preceding cycles on the voltage application time interval of the print element in the current cycle is also expanded to the two pairs of print elements on the both sides of the print element corresponding to the dot $a_0$.

That is, as shown in FIG. 3, four dot groups adjacent to the dot $a_0$, i.e., one dot denoted by reference symbol A, three dots denoted by reference symbol B, three dots denoted by reference symbol C, and five dots denoted by reference symbol D are defined, each dot group is weighted, and the voltage application history data of each group is obtained as a factor for determining the voltage application time of the dot $a_0$ of interest.

Figure 4:
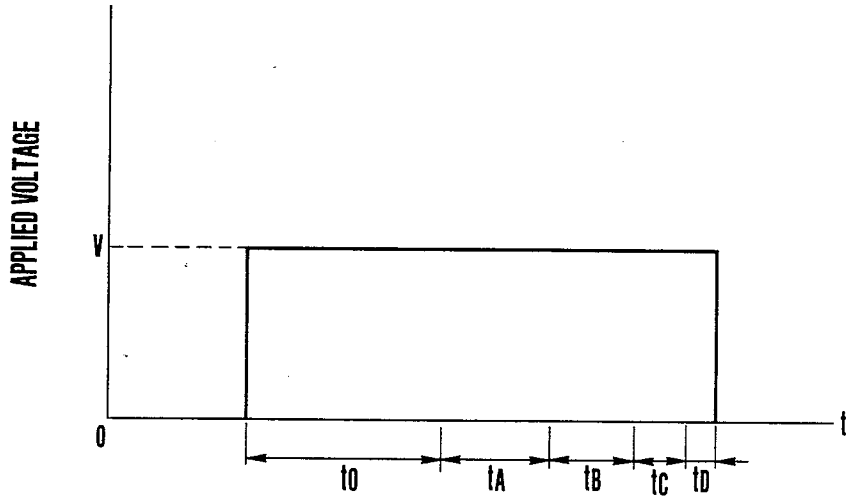
Figure 5:
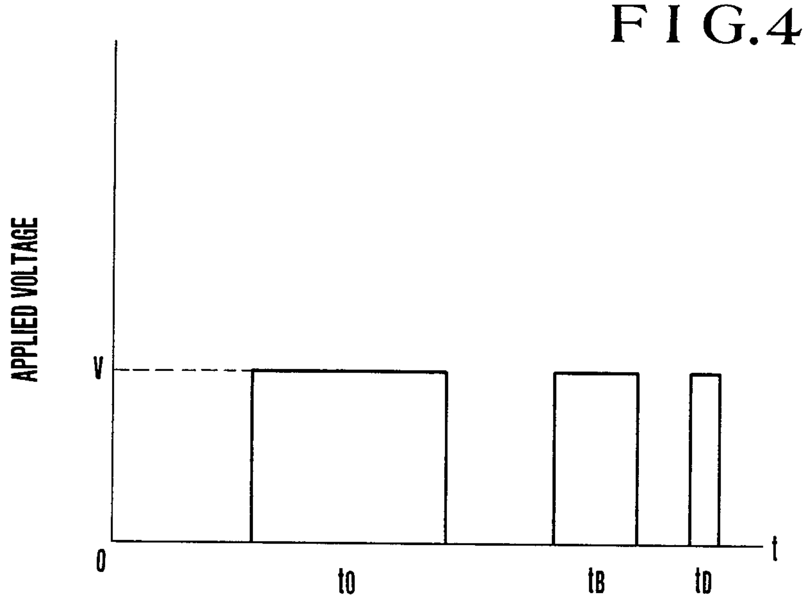

FIG. 4 shows a voltage waveform to be applied to the print element to print the dot $a_0$ when no voltage was applied to any of the dot groups A to D throughout the past four cycles. The voltage is applied during all time intervals $t_0$, $t_A$, $t_B$, $t_C$, and $t_D$. If a voltage was applied to any one of the dot groups A to D, voltage application is not performd during a corresponding time interval $t_A$, $t_B$, $t_C$, or $t_D$. For example, if voltages were applied to the dot groups A and C in the past, a pulse waveform to be applied in the current cycle can be given as shown in FIG. 5.

Note that the length of the time interval $t_A$ to the time interval $t_D$ corresponds to the pulse width determined by equation (13). However, it is changed to an experimental value so as to realized optimally clear printing without departing the spirit and scope of the present invention.

A printing control circuit for performing pulse width control based on the above analysis according to an embodiment of the present invention will be described below.

Figure 6:
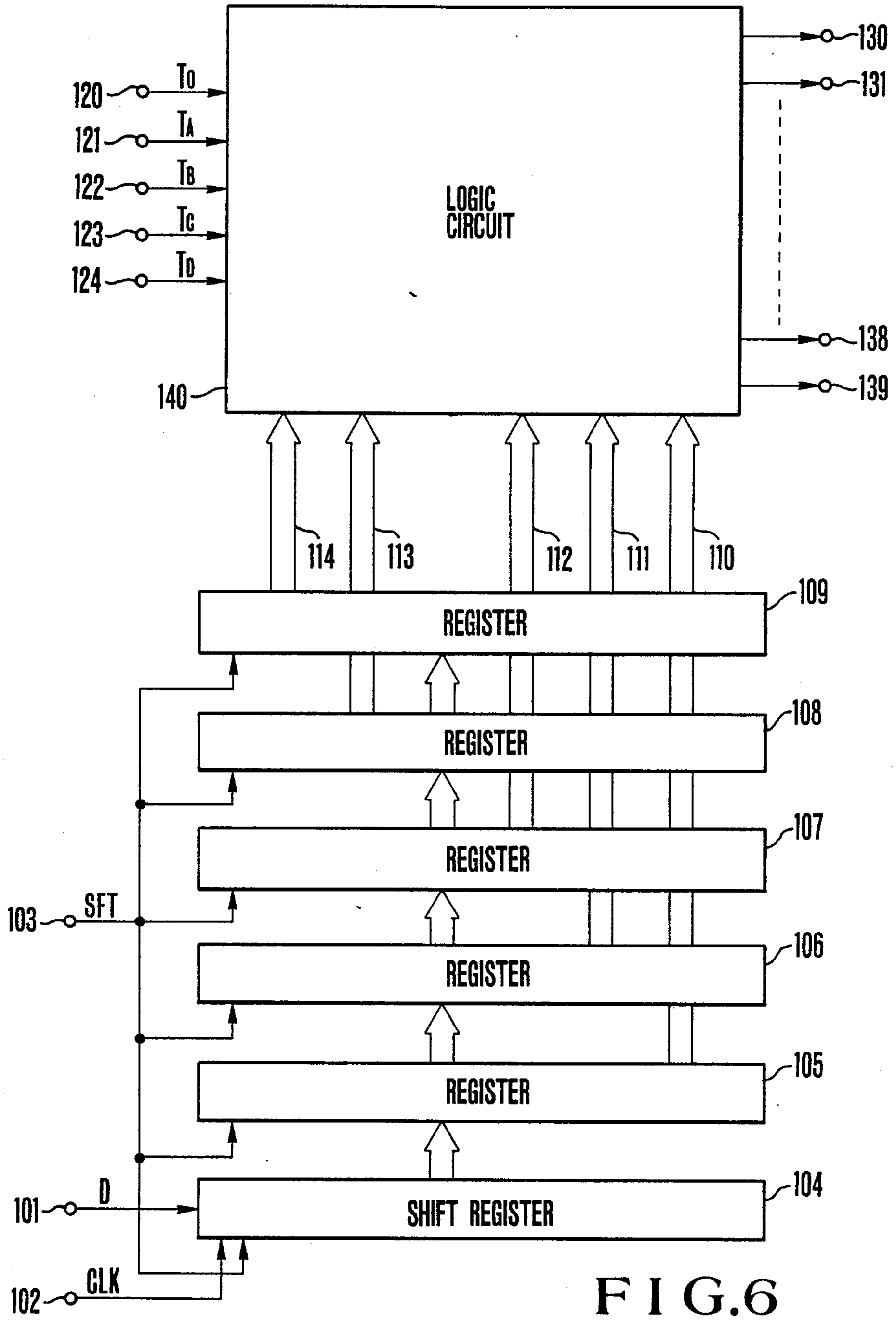
FIG. 6 is a block diagram showing an arrangement of an embodiment of the present invention.

FIG. 6 is a block diagram showing the embodiment of the present invention. Referring to FIG. 6, serial data D for every drive cycle of a print head is supplied to input terminal 101 in synchronism with a clock input CLK to an input terminal 102. This serial data D is temporarily stored in a shift register 104. This input operation is performd simultaneously with a printing operation to be described later.

A plurality of registers 105, 106, 107, 108, and 109 constitute a shift register. The shift register 104 is connected to the register 105. When all the one-cycle serial data D is input to the shift register 104, a shift pulse SFT is supplied from input terminal 103 to the registers 104 to 109. Then, the contents in the shift registers 104, 105, 106, 107, and 108 are respectively shifted to the registers 105, 106, 107, 108, and 109. As a result, the data to be currently printed is set in the register 105, and the data before one, two, three, and four cycles are set in the registers 106, 107, 108, and 109, respectively. At this time, input of data for the next cycle to the shift register 104 is started.

The registers 105 to 109 are connected to a logic circuit 140 through data buses 110 to 114. With this arrangement, the contents in the registers 105 to 109 are input to the logic circuit 140.

Fundamental timing signals $T_0$, $T_A$, $T_C$, and $T_D$ corresponding to the time intervals $t_0$, $t_A$, $t_B$, $t_C$, and $t_D$ shown in FIGS. 4 and 5 are input to input terminals 120, 121, 122, 123, and 124 of the logic circuit 140, respectively.

The logic circuit 140 performs a logic operation on the basis of the fundamental timing signals $T_0$ to $T_D$ and the contents of the registers 105 and 109, obtains a signal waveform corresponding to a voltage pulse to be applied to a corresponding print element, and outputs the obtained signal waveform from a corresponding one of output terminals 130 to 139.

Assume that the position of each dot of the groups A to D in FIG. 3 is represented by (n−i),(n−j) where n indicates that a dot of interest whose applied voltage is to be obtained is located at nth position from the left end position of the register, i indicates that each dot of the groups A to D is a dot of a cycle which is i ahead of the current cycle of the dot of interest, and j indicates that each dot of the groups A to D belong to a jth column from the column including the dot of interest to the left. When a dot is located in a jth column from the column including dot of interest to the right, j has a negative value.

The state of each dot of the groups A to D is represented by $R_{n-i,n-j}$. When a dot is printed, a value of 1 is given, and when a dot is blank, a value of 0 is given. For example, $R_{n-1,n-2}$ represents the printing state of a dot of one cycle before the dot of interest and separated by two dots therefrom to the left.

By representing each dot in this manner, the waveforms shown in FIGS. 4 and 5 can be represented as a set of $t_0$ to $t_D$ by using fundamental timing signals $T_0$, $T_A$, $T_B$ . . . $T_D$ input to the input terminals 120 to 124, as follows:

$$t_0 = R_{n,n} \cdot T_0 \tag{14}$$

$$t_A = R_{n,n} \cdot \overline{(R_{n-1,n})} \cdot T_A \tag{15}$$

$$\begin{aligned} t_B &= R_{n,n} \cdot (\overline{R_{n-2,n}} + \overline{R_{n-1,n-1}} + \overline{R_{n-1,n+1}}) \cdot T_3 \\ &= R_{n,n} \cdot \overline{(R_{n-2,n} \cdot R_{n-1,n-1} \cdot R_{n-1,n+1})} \cdot T_B \end{aligned} \tag{16}$$

-continued $$t_C = R_{n,n} \cdot \overline{(R_{n-2,n-1} \cdot R_{n-3,n} \cdot R_{n-2,n+1})} \cdot T_C \quad (17)$$

$$t_D = R_{n,n} \cdot \overline{(R_{n-2,n-2} \cdot R_{n-3,n-1} \cdot R_{n-4,n} \cdot R_{n-3,n+1} \cdot R_{n-2,n+2})} \cdot T_D \quad (18)$$

Therefore, if the waveform shown in FIGS. 4 and 5 is T, then $$T = t_0 + t_A + t_B + t_C + t_D \quad (19)$$

Figure 7:
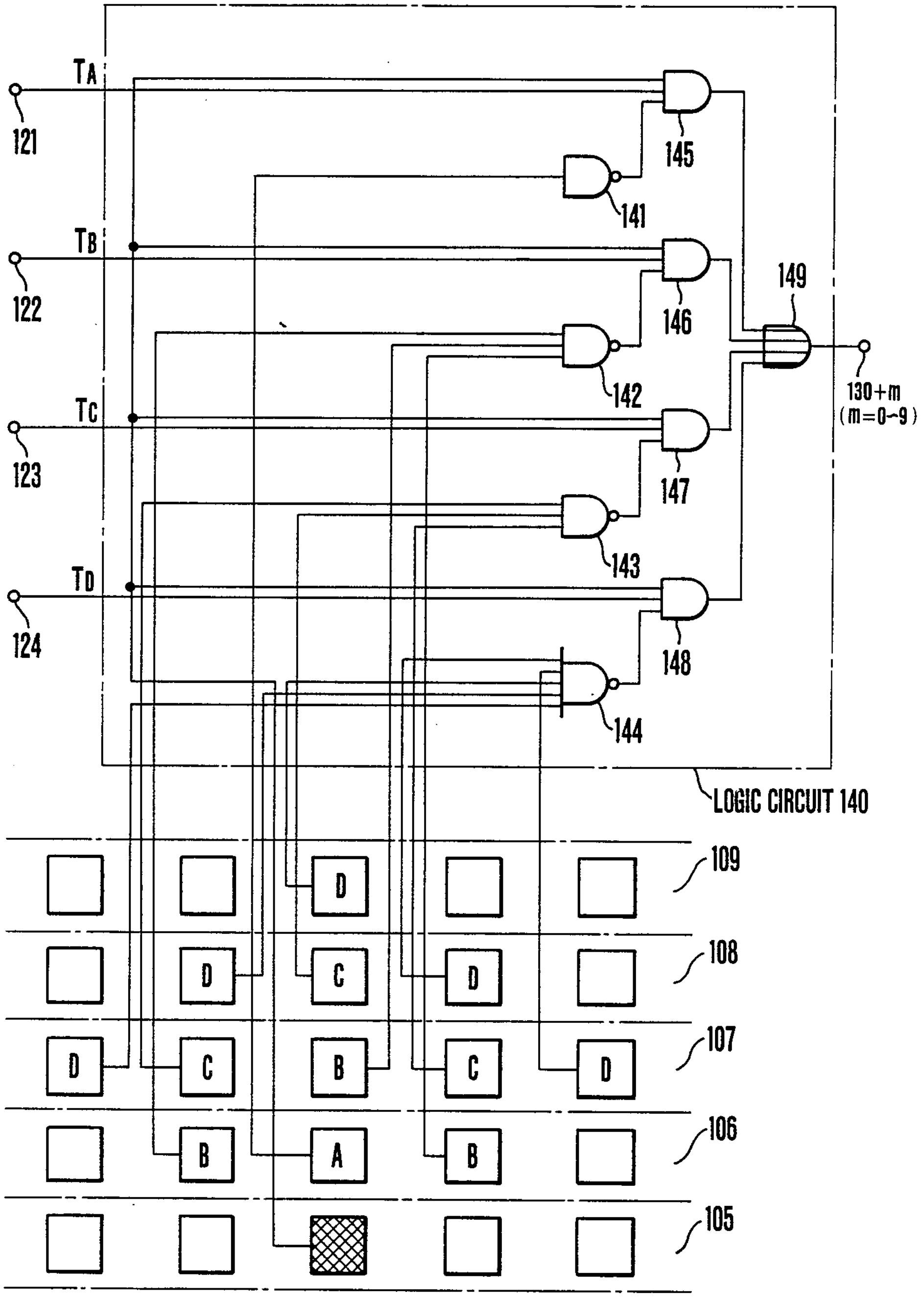
FIG. 7 is a block diagram showing an detailed arrangement of part of logic circuit in FIG. 6.

FIG. 7 shows part of the logic circuit 140 according to the embodiment.

Referring to FIG. 7, when attention is paid to a cross-hatched portion, logic represented by equations (14) to (19) is realized by logic gates 141 to 149. The fundamental timing signals $T_0$, $T_A$, $T_B$, $T_C$ and $T_D$ are set such that the total period of the logic 1 portion of the T waveform is approximately the $t_w'$ period of equation (13). Therefore, stable printing without heat storage can always be performed. A voltage waveform to be applied to a print element corresponding to the dot of interest is output from an output terminal (130+m), where m=0 to 9.

The logic circuit 140 shown in FIG. 7 corresponds to only one bit of the shift register. In practice, however, logic circuits each having the same arrangement as described above are prepared for all the print elements of the printing head, i.e., all the bits of the shift register 105. Since in practice, each logic circuit is constituted by an LSI, a plurality of LSIs connected to each other are used. In the circuit shown in FIG. 7, LSIs must store two excessive bits each in the terminal portions of the shift registers thereof.

Figure 8:
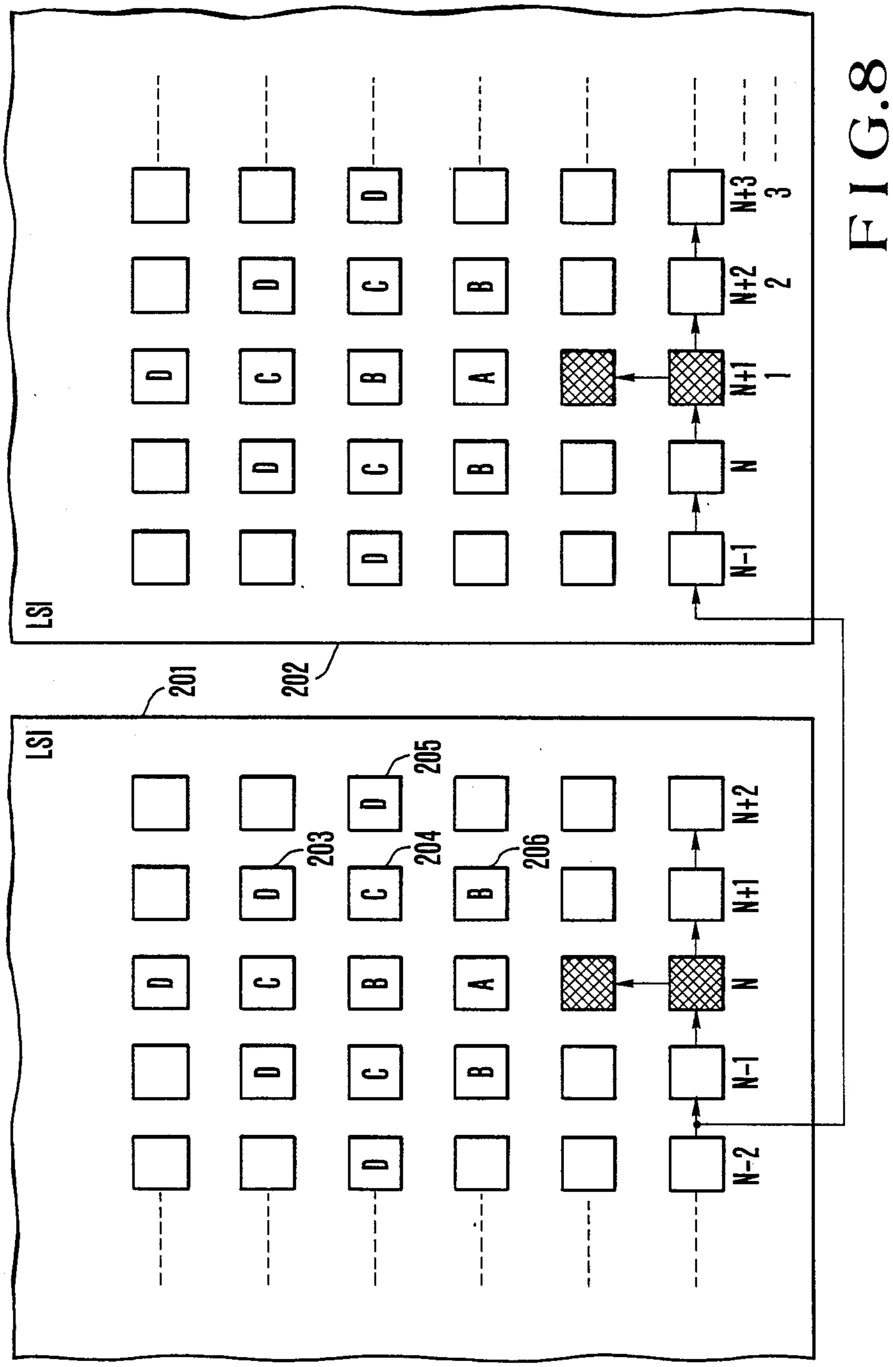
FIG. 8 is block diagram showing a connection circuit in which a plurality of circuits each of which is shown in FIG. 7 are connected to each other.

FIG. 8 shows a connection circuit satisfying the above requirement. Referring to FIG. 8, reference numerals 201 and 202 respectively denote LSIs. Assuming that the LSIs can control N-bit print elements, then each register must have a size of N+2 bits. This is because, as shown in FIG. 8, in order to control Nth bit, data of bits 203, 204, 205, and 206 are required.

The Nth data of the LSI 201 is input to the lowermost shift register of the LSI 202, and is sequentially shifted to the right. In this case, an (N−2)th output of the LSI 201 is input to the leftmost bit of the shift register of the LSI 202. This is because (N+1)th data of the LSI 202 corresponds to the leftmost bit of a print element to be controlled by the LSI 202, and the LSI requires data having the same contents as those of the (N−1)th- and Nth-bit data are required for heat control data for this (N+1)th bit.

With the above-described arrangement, a printer having an arbitrary printing width can be realized by serially connecting a plurality of LSIs.

As has been described above, the present invention comprises a logic circuit for determining the drive time of each print element of the printing head in consideration of the heat dissipation state of each print element in a non-drive period. Therefore, accumulated heat can be minimized even when the printing head is continuously used for a long period of time, and hence high-quality, clear printing patterns can be obtained even when a high-speed printing operation is performed.

What is claimed is:

1. A thermal printing control circuit comprising:

a first serial/parallel shift register for receiving serial image data to be serially printed and for temporarily storing the serial image data;

a second parallel register group comprising a plurality of stages for storing image data corresponding to several previous print lines;

a thermal head having heating elements corresponding to bits of printing data which are to be printed and are stored in a first stage of said second register group;

a first logic gate group for calculating logic formulas $t_0$, $t_A$, $t_B$, $t_C$ and $t_D$ by using a plurality of sequentially input fundamental timing signals ($T_0$, $T_A$, $T_B$, $T_C$, $T_D$) for balancing heat energy of the heating elements of said thermal head in accordance with the printing data of the previous several lines stored in said second register group, and the printing data to be printed; and a second logic gate group for calculating $T = t_0 + t_A + t_B + t_C + t_D$, the logic formulas $t_0$, $t_A$, $t_B$, $t_C$, and $t_D$ being defined by:

$$t_O = R_{n,n} \cdot T_O$$

$$t_A = R_{n,n} \cdot \overline{(R_{n-1,n})} \cdot T_A$$

$$t_B = R_{n,n} \cdot \overline{(R_{n-2,n} \cdot R_{n-1,n-1} \cdot R_{n-1,n+1})} \cdot T_B$$

$$t_C = R_{n,n} \cdot \overline{(R_{n-2,n-1} \cdot R_{n-3,n} \cdot R_{n-2,n+1})} \cdot T_C$$

$$t_D = R_{n,n} \cdot \overline{(R_{n-2,n-2} \cdot R_{n-3,n-1} \cdot R_{n-4,n} \cdot R_{n-3,n+1} \cdot R_{n-2,n+2})} \cdot T_D.$$

2. A thermal printing control circuit comprising a plurality of thermal printing control circuits of claim 1, and a connecting circuit for interconnecting said plurality of thermal printing control circuits.

3. A thermal printing control circuit comprising:

a plurality of integrated circuits each of which can control N thermal print elements; and connecting means for connecting said plurality of integrated circuits to each other;

said integrated circuit including:

a (N+M)-bit first shift register for receiving and storing a series of serial printing image data to be printed by said N thermal print elements, where M is larger than one;

a second register, constituted by a plurality of said (N+M)-bit registers for storing contents of said first shift register by parallelly and sequentially shifting and receiving the contents thereof, for storing printing history data of a plurality of cycles of said N thermal print elements; and a logic circuit for performing a logic operation by using the printing history data of the plurality of cycles of said N thermal print elements, the printing history data being stored in said second shift register, and externally supplied control timing data and for generating drive signals representing voltage waveforms to be applied to said N thermal print elements in a current cycle, wherein said connecting means connects an input terminal of said first shift register of one of said integrated circuit to intermediate bit outputs of said first shift registers of other integrated circuits.

* * * * *